United States Patent
Hurst

(10) Patent No.: US 7,623,860 B2
(45) Date of Patent: *Nov. 24, 2009

(54) MOBILE COMMUNICATION TERMINAL AND METHOD THEREFORE

(75) Inventor: Leon Hurst, Helsinki (FI)

(73) Assignee: Nokia Corporation, Espoo (FI)

( * ) Notice: Subject to any disclaimer, the term of this patent is extended or adjusted under 35 U.S.C. 154(b) by 42 days.

This patent is subject to a terminal disclaimer.

(21) Appl. No.: 10/976,093

(22) Filed: Oct. 27, 2004

(65) Prior Publication Data

US 2006/0089129 A1    Apr. 27, 2006

(51) Int. Cl.
*H04W 4/00* (2006.01)
(52) U.S. Cl. ............. 455/432.1; 455/435.1; 455/414; 455/456.6; 455/466
(58) Field of Classification Search ........... 704/10, 704/8; 455/412.1, 414.1, 414; 345/171; 379/88.06, 142
See application file for complete search history.

(56) References Cited

U.S. PATENT DOCUMENTS

| | | | |
|---|---|---|---|
| 5,701,497 A * | 12/1997 | Yamauchi et al. ............ 704/3 |
| 6,385,586 B1 * | 5/2002 | Dietz ........................ 704/277 |
| 6,600,919 B1 * | 7/2003 | Kawase .................. 455/414.1 |
| 7,010,306 B1 * | 3/2006 | Tanibayashi et al. ...... 455/456.1 |
| 7,340,390 B2 * | 3/2008 | Hurst et al. ................... 704/8 |
| 2003/0104839 A1 * | 6/2003 | Kraft et al. ................. 455/566 |
| 2004/0102201 A1 * | 5/2004 | Levin ........................ 455/466 |

FOREIGN PATENT DOCUMENTS

EP    1480420 A1 * 11/2004

OTHER PUBLICATIONS

Kozierok, Charles M., The PC Guide: Memory Access and Access Time, 1997-2004, http://www.pcguide.com/ref/ram/timingAccess-c.html, pp. 1-3.*

* cited by examiner

*Primary Examiner*—Temica M Beamer
(74) *Attorney, Agent, or Firm*—Perman & Green LLP

(57) ABSTRACT

A method for organizing data records in a memory in a mobile telecommunication terminal is disclosed. The method comprises receiving a plurality of digits, which identify a subscriber terminal in a telecommunication network, in a control unit in the mobile telecommunication terminal. The method moreover comprises storing the plurality of digits in a memory in the mobile telecommunication terminal, and associating the plurality of digits with dictionary selection data designating at least one dictionary stored in the memory.

20 Claims, 11 Drawing Sheets

MOBILE COMMUNICATION TERMINAL AND METHOD THEREFORE

BACKGROUND OF THE INVENTION

1. Field of the Invention

The present invention generally relates to mobile telecommunication terminals, and more specifically to methods and apparatus for facilitating communication by means of mobile telecommunication terminals in a multilingual environment.

2. Brief Description of Related Developments

By the increased use of mobile telecommunication terminals many people are given the opportunity to get in contact with each other practically anywhere at any time. The contact may take the form of e.g. a voice call or a short text message. Examples of systems for providing this kind of mobile services are DAMPS, PCM, GSM and UMTS.

In particular, the use of mobile telecommunication terminals for sending and receiving messages by means of e.g. Short Messaging Service (SMS), Enhanced Messaging Service (EMS), Multimedia Messaging Service (MMS), Email and Instant Messaging (TM) has become very popular due to their fast and convenient way of exchanging information. By using a messaging service rather than establishing a voice communication, a user may not only save time but also money since the cost for sending a message is generally much lower than the cost for placing e.g. a telephone call. Additionally, a received message may be stored in the mobile telecommunication terminal for later retrieval, a feature that is beneficial if the message e.g. comprises an address, a schedule for a meeting, a telephone number etc.

Even though many mobile telecommunication terminals includes functionality for sending and receiving messages, the way of entering text in the message is in most cases cumbersome due to the generally small size of the mobile telecommunication terminal. More specifically, the size of the input unit in a mobile telecommunication terminal, e.g. a keyboard, an on-screen touch-sensitive keyboard, a navigation wheel or a joystick, is restricted by the overall size of the mobile telecommunication terminal, which hence makes entry of larger amount of text cumbersome.

One way to facilitate the entering of text in mobile telecommunication terminals are by the provision of text prediction software, such as T9 from Tegic Communications, 1000 Dexter Avenue N., Suite 300, Seattle, Wash. 98109 USA. The text prediction software generally uses one or more dictionaries, which comprise commonly used words in different languages. For example, an English dictionary comprises words such as: car, train, meeting, hour, etc, while a corresponding German dictionary comprises words such as: Auto, Zug, Tagung, Stunde, etc. When a user of a mobile telecommunication terminal currently using an English dictionary is entering the letters "ho", the prediction software displays a list of words starting with the letters "ho", such as e.g. hour, whereupon the user may select the word instead of entering all letters of that specific word.

However, even though the use of text prediction software facilitates the entering of text in a message, the user is still faced with the problem of selecting a suitable dictionary to use. For example, an English user with German friends may once in a while want to enter text in German. The user in this situation is hence compelled to switch dictionary language every time he or she addresses recipients with different native tongue. The problem of selecting correct dictionary language in a multi-language environment is even more eminent when a user is roaming and wants to change between many different dictionary languages many times a day. For example a user who travels through Europe on a business trip may want to send messages many times a day for booking meetings, making reservations at hotels, etc in different languages depending on his current location.

There is hence a need for a fast and reliable method for selecting a dictionary to use when using a text prediction scheme for entering text in message.

SUMMARY OF THE INVETION

The object of the present invention is to overcome the above-described problems of the known technologies in regard to selecting a language to use when entering text in a message.

A particular advantage of the present invention is the provision of a simple and reliable method for automatic language selection when entering text in a mobile telecommunication terminal.

A particular feature of the present invention relates to the provision of a mobile telecommunication terminal for organizing data records in a memory thereof.

The above objects, advantages and features together with numerous other objects, advantages and features, which will become evident from the detailed description below, are obtained according to a first aspect of the present invention by a method for organizing data records in a memory in a mobile telecommunication terminal. The method comprising:

receiving a plurality of digits in a control unit in the mobile telecommunication terminal, said digits identifying a subscriber terminal in a telecommunication network, storing the plurality of digits in a memory in the mobile telecommunication terminal, and associating the plurality of digits with dictionary selection data designating at least one dictionary stored in the memory.

According to one embodiment the method comprises:

determining if the plurality of digits comprise a country code, and if the plurality of digits comprise a country code, associating the plurality of digits with dictionary selection data designating at least one dictionary stored in the memory, which dictionary is in a language corresponding to the country code.

According to one embodiment the method comprises:

determining if the plurality of digits comprise a country code, and if the plurality of digits do not comprise a country code, associating the plurality of digits with dictionary selection data designating at least one default dictionary stored in the memory.

According to one embodiment the method comprises:

determining, from the sequential structure of the digits, in which country the plurality of digits relate to a subscriber number, and associating the plurality of digits with dictionary selection data designating at least one dictionary stored in the memory, which dictionary is in a language corresponding to the country in which the plurality of digits relate to a subscriber number.

According to one embodiment the method comprises:

presenting on a display in the mobile telecommunication terminal, for selection, data identifying at least one dictionary, receiving a selection of at least one dictionary, and associating the plurality of digits with dictionary selection data designating at least one dictionary based on said received selection.

According to one embodiment the method comprises:

storing the dictionary selection data together with said plurality of digits in a database record in the memory.

According to another aspect of the invention a mobile telecommunication terminal comprises:

a memory comprising at least one dictionary in a predetermined language; and a control unit adapted to:

receive a plurality of digits, said digits identifying a subscriber terminal in a telecommunication network, and associating the plurality of digits with dictionary selection data designating at least one dictionary stored in the memory.

According to another aspect of the invention a method for entering text in a mobile telecommunication terminal comprises:

reading a first set of digits from a memory in the mobile telecommunication terminal, said digits identifying a subscriber terminal in a telecommunication network, reading first dictionary selection data, which are associated with the first set of digits and designating at least one dictionary stored in the memory, from the memory, selecting the at least one designated dictionary stored in the memory based on said first dictionary selection data, receiving one or more characters in the control unit, and presenting on a display in the mobile telecommunication terminal, for selection, one or more words from the dictionary based on the received characters.

According to one embodiment the method comprises:

reading a second set of digits from the memory in the mobile telecommunication terminal, said digits identifying a subscriber terminal in a telecommunication network, reading second dictionary selection data from the memory, said second dictionary selection data being associated with the second set of digits and designating at least one dictionary stored in the memory, determining if the first dictionary selection data and the second dictionary selection data correspond, and if the first dictionary selection data and the second dictionary selection data correspond, select the at least one designated dictionary stored in the memory based on the corresponding dictionary selection data.

According to one embodiment the method comprises:

Selecting at least one default dictionary stored in the memory if first and second dictionary selection data do not correspond.

According to another aspect of the invention a mobile telecommunication terminal comprises:

a display, a memory comprising a first set of digits identifying a subscriber terminal in a telecommunication network; and a control unit adapted to:

read the first set of digits from the memory, read first dictionary selection data, which are associated with the first set of digits and designating at least one dictionary stored in the memory, from the memory, select the at least one designated dictionary stored in the memory based on said first dictionary selection data, receive one or more characters, and present on the display, for selection, one or more words from the dictionary based on the received characters.

According to another aspect of the invention a method for entering text in a mobile telecommunication terminal comprises:

receiving a plurality of digits in a control unit in the mobile telecommunication terminal, said digits identifying a subscriber terminal in a telecommunication network, determining if the plurality of digits comprise a country code, if the plurality of digits comprise a country code, selecting at least one dictionary stored in a memory in the mobile telecommunication terminal, which dictionary is in a language corresponding to the country code, receiving one or more characters in the control unit, and presenting, for selection, one or more words from the dictionary based on the received characters.

According to one embodiment the method comprises:

Selecting at least one default dictionary stored in the memory if the received plurality of digits do not comprise a country code.

According to another aspect of the invention a mobile telecommunication terminal comprises:

a display, a memory comprising at least one dictionary; and a control unit adapted to:

receive a plurality of digits, said digits identifying a subscriber terminal in a telecommunication network, determine if the plurality of digits comprise a country code, if the plurality of digits comprise a country code, select at least one dictionary stored in the memory, which dictionary is in a language corresponding to the country code, receive one or more characters in the control unit, and present on the display, for selection, one or more words from the dictionary based on the received characters.

According to another aspect of the invention a method for entering text in a mobile telecommunication terminal comprises:

receiving a plurality of digits in a control unit in the mobile telecommunication terminal, said digits identifying a subscriber terminal in a telecommunication network, determining, from the sequential structure of the digits, in which country the plurality of digits relate to a subscriber number, selecting at least one dictionary stored in the memory, which dictionary is in a language corresponding to the country in which the plurality of digits relate to a subscriber number, receiving one or more characters in the control unit, and presenting, for selection, one or more words from the dictionary based on the received characters.

According to another aspect of the invention a mobile telecommunication terminal comprises:

a display, a memory comprising at least one dictionary; and a control unit adapted to:

receive a plurality of digits, said digits identifying a subscriber terminal in a telecommunication network, determine, from the sequential structure of the digits, in which country the plurality of digits relate to a subscriber number, select at least one dictionary stored in the memory, which dictionary is in a language corresponding to the country in which the plurality of digits relate to a subscriber number, receive one or more characters in the control unit, and present on the display, for selection, one or more words from the dictionary based on the received characters.

According to another aspect of the invention a mobile telecommunication terminal comprises a memory comprising a database with records, each record comprising:

a plurality of digits identifying a subscriber in a telecommunications network, and dictionary selection data designating at least one dictionary stored in the memory

BRIEF DESCRIPTION OF THE DRAWINGS

Further objects, features and advantages of the present invention will become apparent upon consideration of the following detailed description in conjunction with the appended drawings.

DETAILED DESCRIPTION OF THE PREFERRED EMBODIMENT(S)

Figure 1:
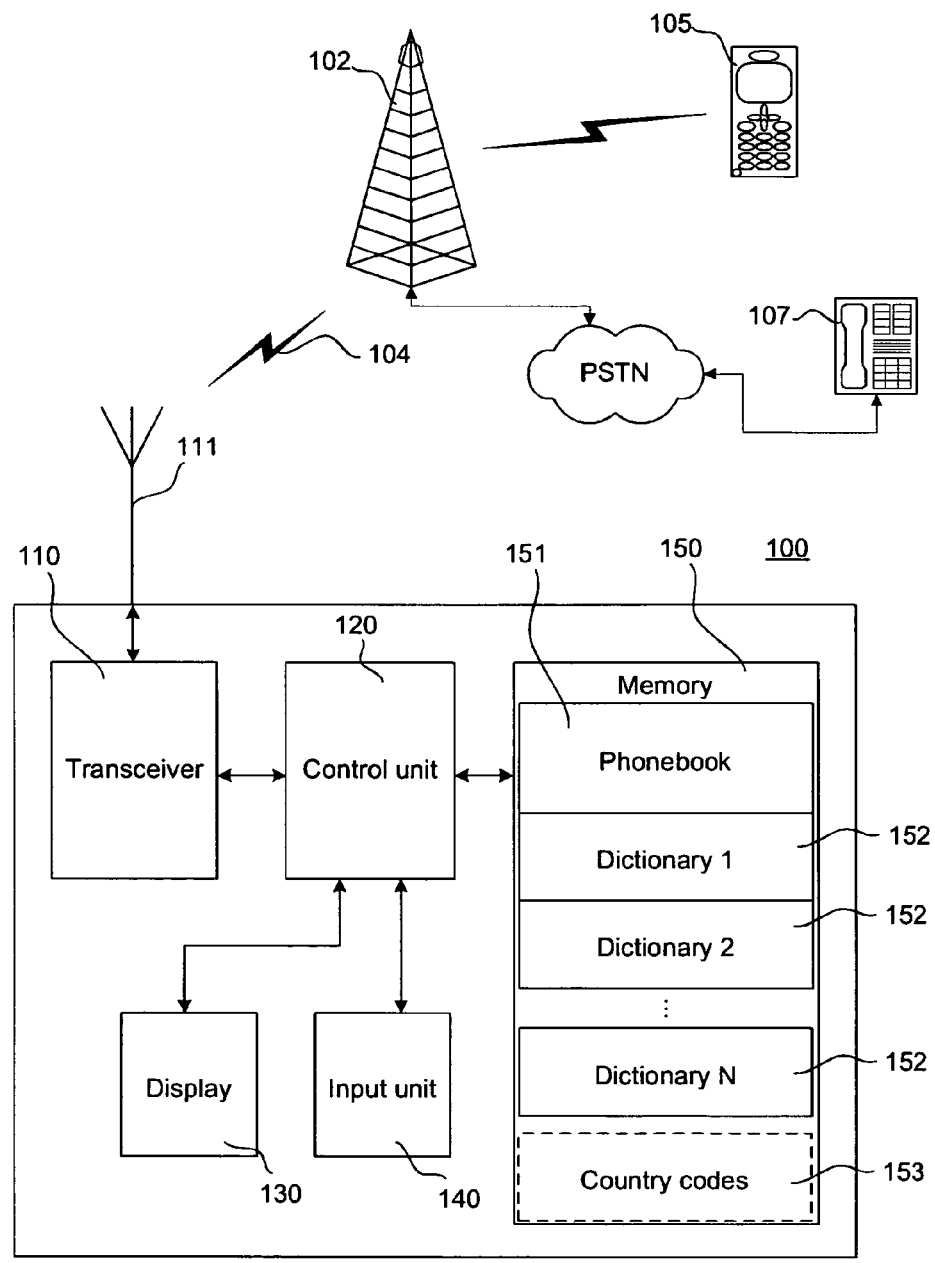
FIG. 1 illustrates a mobile telecommunication terminal according to the present invention.

FIG. 1 is a schematic block diagram of a mobile telecommunication terminal 100 according to a preferred embodiment of the present invention. A transceiver 110 is used for communicating with a base station 102 via an antenna 111. The base station 102 is in communication with other mobile telecommunication terminals 105 via a mobile communications network, and stationary terminals 107 via e.g. a public switched telephone network (PSTN) The transceiver 110 may be arranged to operate in various frequency bands, such as 880-915 MHz and 925-960 MHz (GSM900), 1710-1785 MHz and 1505-1880 MHz (GSM1800) 1850-1910 MHz and 1930-1990 MHz (GSM1900), and 1885-2025 MHz and 2110-2200 MHz (UMTS). It is appreciated that other frequency bands are equally possible depending on the specifications of the network in which the mobile telecommunication terminal 100 is to operate.

A control unit 120 is coupled to the transceiver 110. The control unit 120 may comprise signal processing circuitry in order to process e.g. voice data from a user of the mobile telecommunication terminal 100 and provide the transceiver 110 with the processed data for transmission to the base station 102. Likewise, the control unit 120 may comprise signal processing circuitry for processing data received from the other telecommunication terminals 105, 107 in order to provide the user of the mobile telecommunication terminal 100 with e.g. audio, image or video data. Alternatively (not shown) some or all of the signal processing functionality may be provided by specialized circuitry in the mobile telecommunication terminal 100.

The control unit 120 is coupled to a display 130 for providing a user of the mobile telecommunication terminal 100 with visual data regarding e.g. a specific call in progress, telecommunication numbers stored in the mobile telecommunication terminal 100, signal strength of the wireless communication link 104, messages received from other mobile telecommunication terminals, etc. In particular, the display may provide the user of the mobile telecommunication terminal 100 with data regarding the current language used for predicting which word that is currently entered when writing a text message.

The control unit 120 is moreover coupled to an input unit 140, which may be in the form of a keyboard; an on-screen touch-sensitive keyboard; a navigation wheel or joystick for scrolling and selecting items, digits and/or characters shown on the display 120; etc. The input unit 140 may be integral with the mobile telecommunication terminal 100 or separate from the mobile telecommunication terminal 100, wherein the input unit is connected to the mobile telecommunication terminal when needed. The mobile telecommunication terminal 100 may alternatively be provided with an integral input unit 140 in the form of a navigation wheel for normal use as well as a connector for connecting an external input unit in the form of a keyboard for entering larger amounts of text (not shown).

A memory 150 is connected to the control unit 120 and comprises a list of telecommunication numbers 151, hereinafter referred to as a "phonebook", which facilitates the establishing of communications to other terminals connected to the network. A user of the mobile telecommunication terminal 100 may use the phonebook 151 for storing telecommunication numbers in different formats, i.e. the telecommunication numbers may be stored as subscriber numbers or international telecommunication numbers, i.e. telecommunication numbers comprising a country code.

The memory 150 also comprises one or more dictionaries 152 which are used for improving the entering of text in the mobile telecommunication terminal 100 by means of the input unit 140. More specifically, as described above, each dictionary 152 comprises words from one specific language. Depending on the available memory size and the desired number of dictionaries 152 to use, each dictionary 152 may comprise more or less words from each specific language. In case of a small available memory size, each dictionary 152 may comprise only the most frequently used words in each language, while a large available memory size may permit a more complete list of words in each dictionary 152. The control unit 120 is moreover preferably adapted to use more than one dictionary 152 simultaneously. A user of the mobile telecommunication terminal 100 may hence be provided with e.g. a Euro dictionary being a combination of an English, a German and a French dictionary 152.

It is furthermore appreciated that one or more dictionaries 152 in the memory 150 may be user-specific dictionaries 152 which are compiled by the user after purchase of the mobile telecommunication terminal 100. The user-specific dictionaries 152 preferably comprise words that are not present in any other, language-specific, dictionary 152. Additionally, one or more of the dictionaries may be organized from an application rather than a language perspective, i.e. the dictionaries comprise words from a specific field of application, such as economics, computer science, telecommunications, etc. Consequently persons working in e.g. a financial department may use an economy-specific dictionary in addition to any other language-specific dictionary.

The memory 150 may also comprise a list of different country codes according to ITU recommendation E.164 from the International Telecommunication Union (ITU). Examples of country codes are: 46 for Sweden, 45 for Denmark, 47 for Norway, 49 for Germany etc.

It is understood in this context that the memory 150 may be a single memory or many different memories implemented by means of different technologies (such as RAM, ROM, EPROM, EEPROM, Flash, etc) which all are accessible by the control unit 120.

Figure 2:
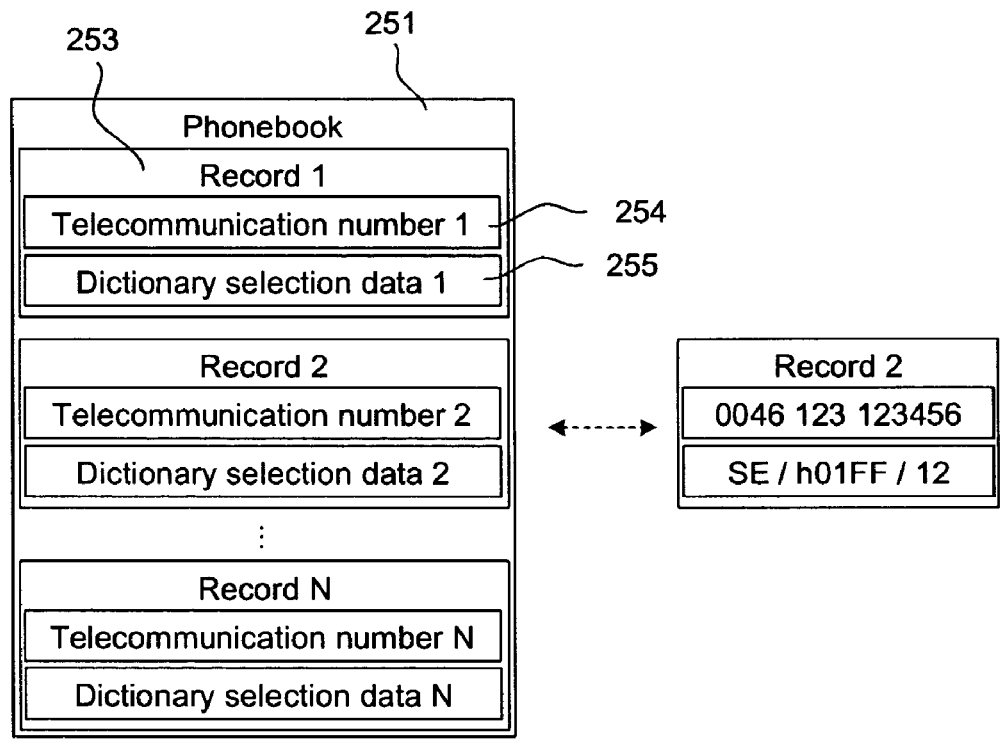
FIG. 2 is a schematic block diagram illustrating a memory organization according to a preferred embodiment of the present invention.

FIG. 2 is a schematic block diagram illustrating a preferred memory organization according to one embodiment of the present invention. The phonebook 251 stored in the memory 150 is adapted to store one or more data records 253 which each in addition to a telecommunication number to another user also comprises dictionary selection data 255. The telecommunication number may be e.g. a subscriber number used for establishing a communication with another user in the same telecommunications network as the mobile telecommunication terminal or an international telecommunication number comprising a country code. It is appreciated that the telecommunication number may also comprise a national significant number if the current telecommunication network standard so requires.

The dictionary selection data may in one embodiment be a series of characters identifying the language of the desired dictionary 152 (e.g. SE for Sweden). The dictionary selection data may also be in the form of an address (e.g. h01FF) pointing out a start address of the desired dictionary in the memory 150. The dictionary selection data may also be in the form of a variable indicating the ordinal number (e.g. 12) of the desired dictionary 152 in a sequence of dictionaries in the memory 150.

It is understood that the records besides the telecommunication number and the dictionary selection data also may comprise additional fields, such as an address, an email address, a fax number etc.

Figure 3:
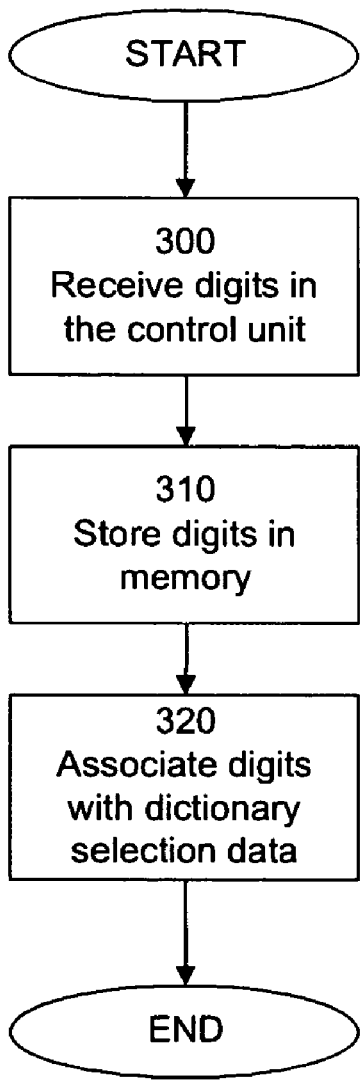
FIG. 3 is a schematic graph illustrating a method for organizing data records in a memory 150 in a mobile telecommunication terminal 100 according to a first aspect of the present invention.

FIG. 3 is a schematic graph illustrating a method for organizing data records in a memory 150 in a mobile telecommunication terminal 100 according to a first aspect of the present invention.

In this embodiment the control unit 120 in step 300 receives digits, which identifies a subscriber terminal 105, 107 in a telecommunication network, from either the input unit 140 or the memory 150. In the latter case the user selects a previously stored telecommunication number from the phonebook 151 in the memory 150. In the former case the user of the mobile telecommunication terminal 100, when he or she wants to store a telecommunication number used for establishing a communication with another terminal 105, 107, inputs a series of digits on the input unit 140 by e.g. pressing the appropriate keys on a keyboard or selecting the digits by means of a navigation wheel and the display 130. It is appreciated that the receiving functionality provided by the control unit 120 may also be implemented by means of specific hardware, such as a Field Programmable Gate Array (FPGA), an Application specific Integrated Circuit (ASIC), discrete logic etc.

The user may then in step 310 instruct the control unit 120 to store the plurality of digits corresponding to the telecommunication number in the memory 150 in the mobile telecommunication terminal 100. If the digits are read from the memory 150 and received in the control unit 120, the user does not have to remember the specific digits. The telecommunication numbers in the phonebook 151 are preferably associated with the name of a person or company, wherein the name rather than the numbers are displayed for selection the display 130.

In step 320 the control unit 120 associates the plurality of digits with dictionary selection data designating at least one dictionary 152 stored in the memory 150. As mentioned above, the control unit 120 may be adapted to use more than one dictionary 152 simultaneously. The dictionary selection data may hence designate e.g. a Euro dictionary being a multi-designation of an English, a German and a French dictionary 152. The association may be stored in a data field 255 in the same record 253 in the phonebook 251 or as a pointer which links the dictionary selection data 255 designating a specific dictionary 152 stored in the memory 150 to the telecommunication number 254. It is appreciated that the associating functionality provided by the control unit 120 may also be implemented by means of specific hardware, such as a Field Programmable Gate Array (FPGA), an Application specific Integrated Circuit (ASIC), discrete logic etc.

Figure 4:
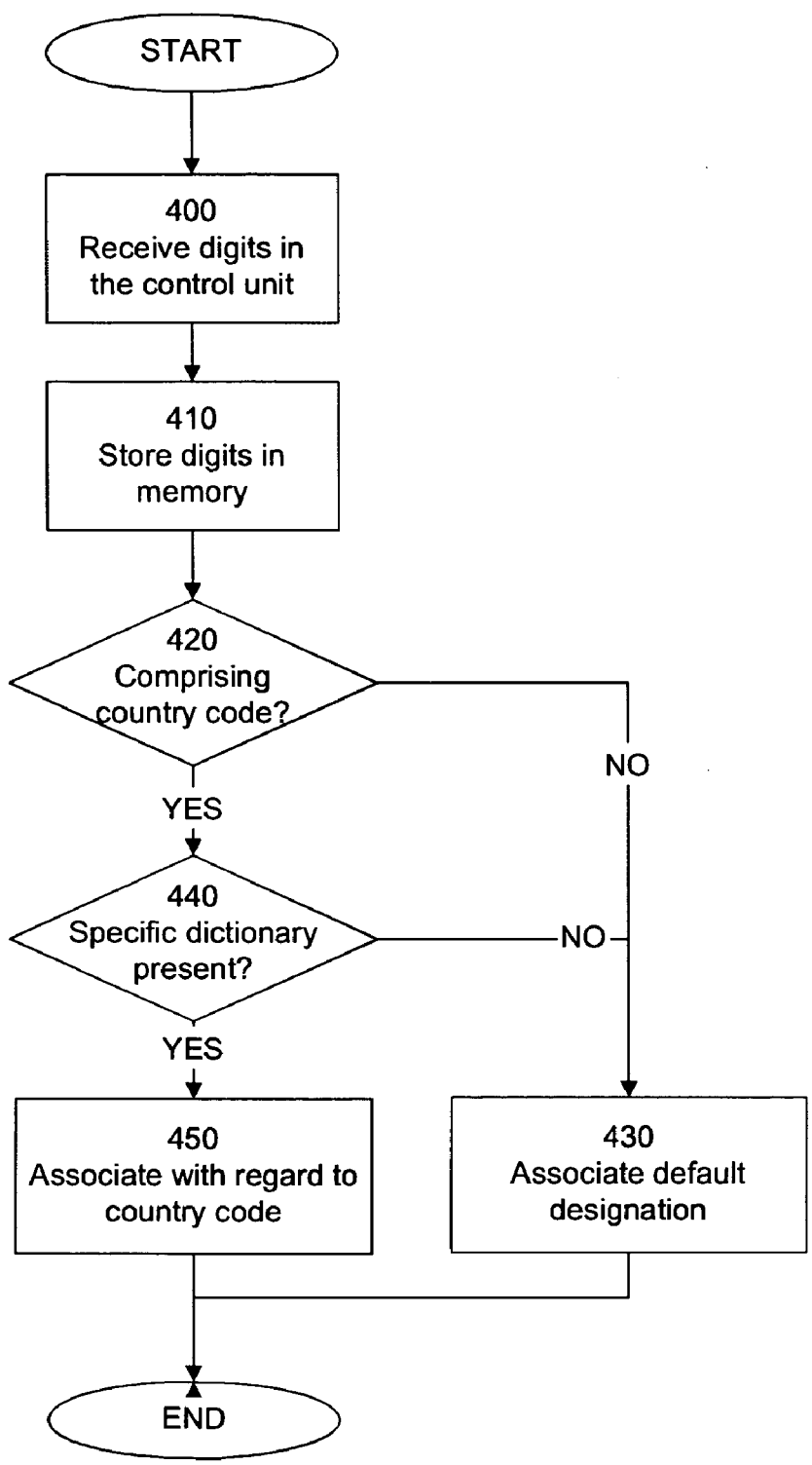
FIG. 4 is an illustration in more detail of a method for associating a telecommunication number with a specific dictionary according to one embodiment of the present invention.

FIG. 4 is an illustration in more detail of a method for associating a telecommunication number with a specific dictionary according to one embodiment of the present invention. Steps 400 and 410 correspond to the steps 300 and 310 disclosed above.

In step 420 the control unit 120 determines if one or more of the digits entered by means of the input unit 140 or read out of the memory 150 correspond to a country code. A simple and straightforward method for determining if the digits comprise a country code is to compare the first digits in the received sequence of digits with the country codes 153 stored in the memory 150. More complex schemes taking the structure of the entire sequence of digits into account is, however, equally possible. It is appreciated that the determining functionality provided by the control unit 120 may also be implemented by means of specific hardware, such as a Field Programmable Gate Array (FPGA), an Application specific Integrated Circuit (ASIC), discrete logic etc. If not the control unit in step 430 associates the plurality of digits with dictionary selection data designating a default dictionary, such as an English dictionary.

If the plurality of digits comprise a country code, the control unit 120 in step 440 determines if a dictionary 152 in a language corresponding to the country code is present in the memory 150. That is, if the telecommunication number e.g. comprises the country code 46, the control unit 120 determines if the memory 150 comprises a dictionary in Swedish.

If not, the routine jumps to step 430, wherein the control unit associates the plurality of digits with dictionary selection data designating at least one default dictionary stored in the memory 150.

However, if the memory 150 comprises a dictionary in a language specified by the country code, the control unit 120 in step 450 associates the plurality of digits with dictionary selection data 255 designating at least one dictionary 152 which is in a language corresponding to the country code. As mentioned above, the control unit 120 may be adapted to use more than one dictionary 152 simultaneously. The dictionary selection data may hence designate e.g. a Euro dictionary being a multi-designation of an English, a German and a French dictionary 152. Alternatively, the control unit 120 may use the display 130 for presenting data identifying one or more countries or languages corresponding to the country code. The user may then select the country or language, wherein the control unit 120 associates the plurality of digits with dictionary selection data 255 designating at least one dictionary 152 which is in a language corresponding to the country code.

Figure 5:
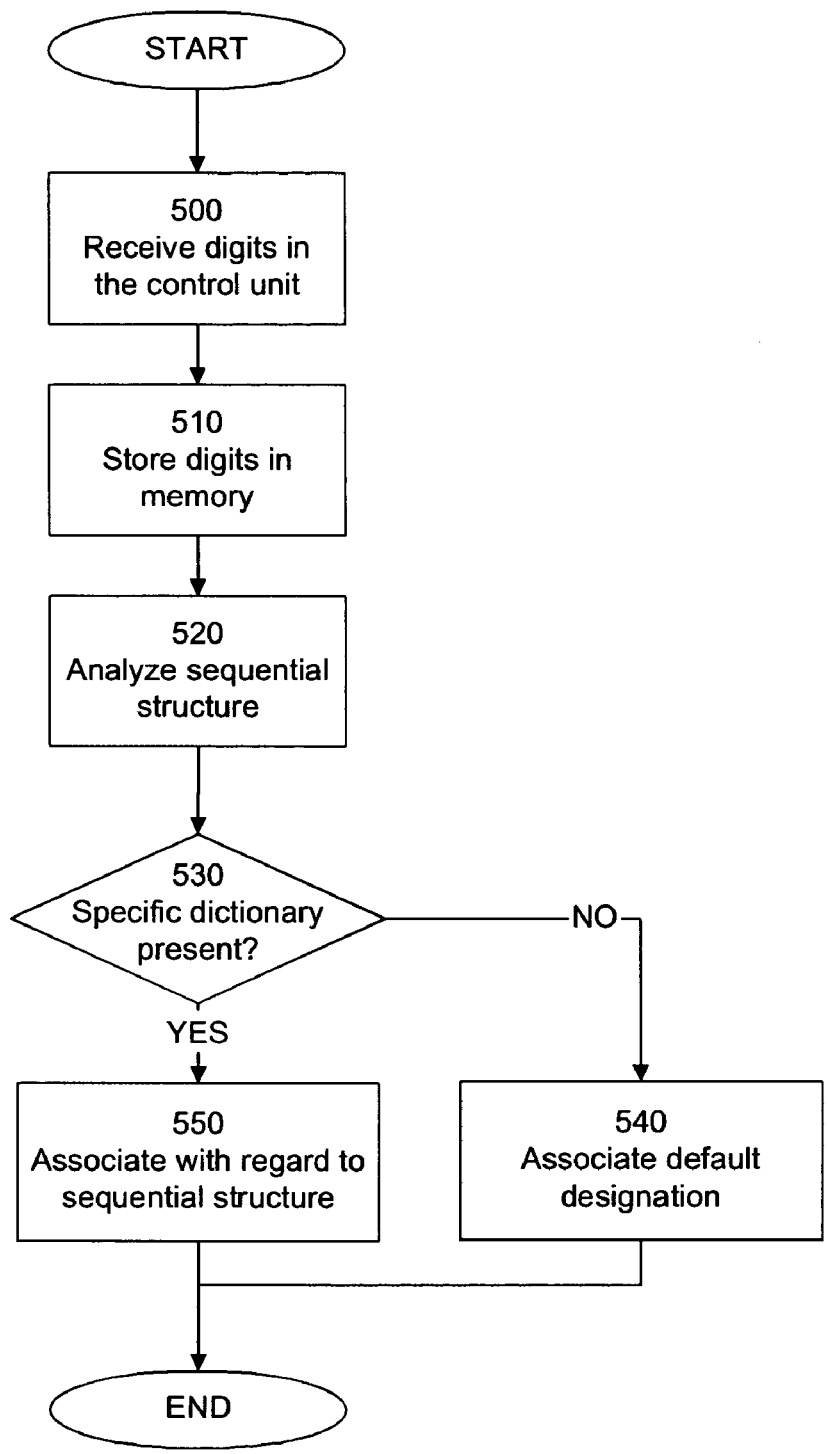
FIG. 5 is an illustration in more detail of a method for associating a telecommunication number with a specific dictionary according to another embodiment of the present invention.

FIG. 5 is an illustration in more detail of a method for associating a telecommunication number with a specific dictionary according to another embodiment of the present invention. Steps 500 and 510 correspond to the steps 300 and 310 disclosed above.

In step 520 the control unit 120 analyzes the sequential structure of the sequence of digits received in step 500. The analysis is preferably based on the numbering structure found in ITU recommendation E.164. By comparing the sequential structure of the received digits with the different numbering structures found in different countries, the control unit 120 may determine in which country the plurality of digits relate to a subscriber number. It is appreciated that the analyzing functionality provided by the control unit 120 may also be implemented by means of specific hardware, such as a Field Programmable Gate Array (FPGA), an Application specific Integrated Circuit (ASIC), discrete logic, etc.

The control unit 120, in step 530, determines if a dictionary 152 in a language corresponding to the country in which the plurality of digits relate to a subscriber number is present in the memory 150. That is, if sequential structure of the telecommunication number points out Sweden, the control unit 120 determines if the memory 150 comprises a dictionary in Swedish.

If not, the routine jumps to step 540, wherein the control unit associates the plurality of digits with dictionary selection data designating at least one default dictionary stored in the memory 150.

However, if the memory 150 comprises a dictionary in a language specified by the sequential structure of the telecommunication number, the control unit 120 in step 550 associates the plurality of digits with dictionary selection data 255 designating at least one dictionary 152 stored in the memory, which dictionary 152 is in a language corresponding to the country in which the plurality of digits relate to a subscriber number.

Alternatively, the control unit 120 may use the display 130 for presenting data identifying one or more countries in which the plurality of digits relate to a subscriber number. The user may then select a specific country whereupon the control unit 120 associates the plurality of digits with dictionary selection data 255 designating a dictionary 152 in a language corresponding to the country in which the plurality of digits relate to a subscriber number.

Figure 6:
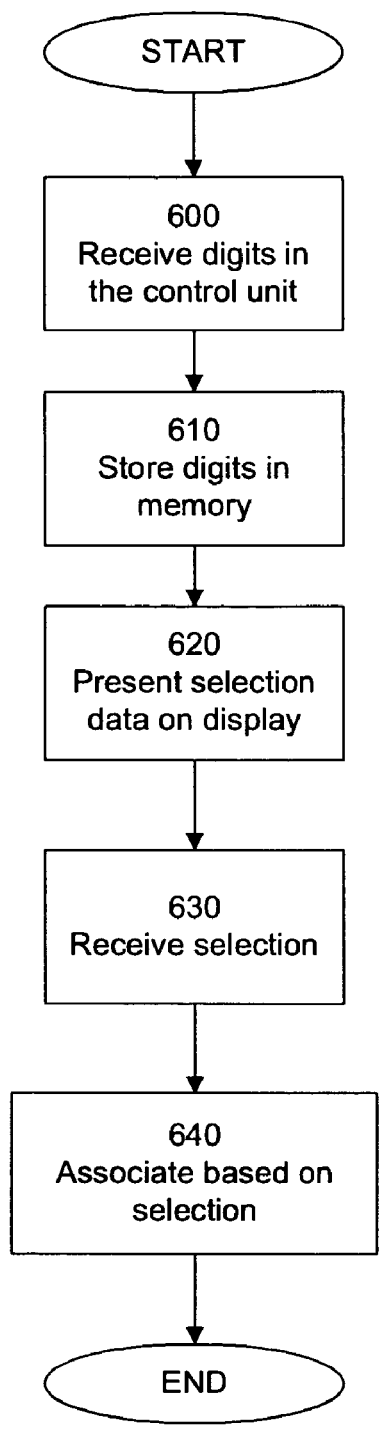
FIG. 6 is an illustration in more detail of a method for associating a telecommunication number with a specific dictionary according to yet another embodiment of the present invention.

FIG. 6 is an illustration in more detail of a method for associating a telecommunication number with a specific dictionary according to yet another embodiment of the present invention. Steps 600 and 610 correspond to the steps 300 and 310 disclosed above.

In step 620 the control unit 120 presents on the display in the mobile telecommunication terminal 100 data identifying at least one dictionary 152. The presentation is preferably in the form of a list of codes, such as SE for Swedish dictionary, GB for British dictionary etc.

In step 630 the control unit 120 receives a selection of at least one dictionary 152 from the list presented in step 620. The selection may be in the form of a press on a specified button on a keyboard in the input unit 140, a touch on the screen if touch-sensitivity is provided for, etc.

In step 640 the control unit associates the plurality of digits with dictionary selection data designating at least one dictionary based on said received selection.

Figure 7:
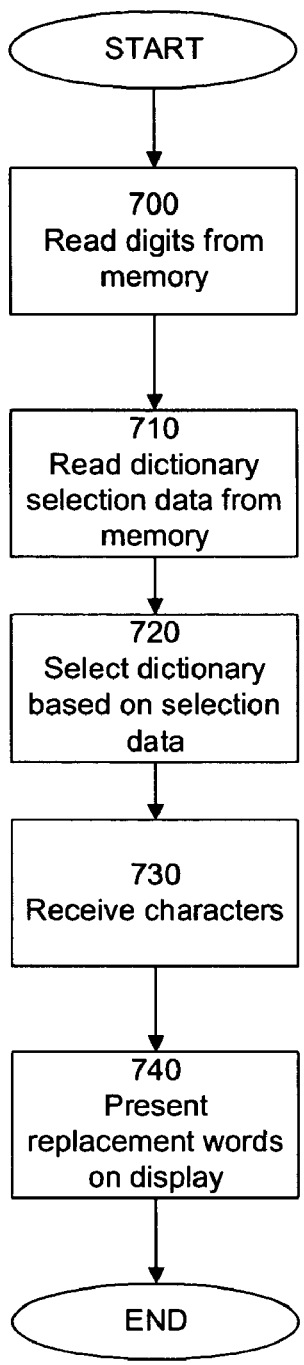
FIG. 7 is an illustration of a method for entering text in a mobile telecommunication terminal according to one embodiment of the present invention.

FIG. 7 is an illustration of a method for entering text in a mobile telecommunication terminal according to one embodiment of the present invention.

In step 700 the control unit 120 reads a first set of digits from the phonebook 151 in the memory 150 in the mobile telecommunication terminal 100 or from a message that has previously been received in the mobile telecommunication terminal 100 from another terminal 105.

The digits correspond to a telecommunication number and identify a subscriber terminal in a telecommunication network. As disclosed above, the telecommunication number may be e.g. a subscriber number used for establishing a communication with another user in the same telecommunications network as the mobile telecommunication terminal or an international telecommunication number comprising a country code. It is moreover appreciated that the telecommunication number may also comprise a national significant number if the current telecommunication network standard so requires.

In step 710 the control unit 120 reads first dictionary selection data from the memory 150. The dictionary selection data are associated with the first set of digits and designates at least one dictionary 152 stored in the memory 150. As disclosed above, the association may be in the form of a pointer or a reserved data field 255 in the phonebook 151.

In step 720 the control unit 120 selects the designated dictionary 151 stored in the memory 150 based on the first dictionary selection data. The selection may be in the form of loading the address of the start of the dictionary 151 in the control unit for sequential reading, loading the entire dictionary 151 from a non-volatile memory (e.g. Flash Memory) into a RAM for quick access to the records, or in any other form in which the control unit 120 gains access to the words stored in the dictionary 151. It is appreciated that the selecting functionality provided by the control unit 120 may also be implemented by means of specific hardware, such as a Field Programmable Gate Array (FPGA), an Application specific Integrated Circuit (ASIC), discrete logic etc.

In step 730 the control unit 120 receives one or more characters entered by means of the input unit 140. The characters are entered in the mobile telecommunication terminal 100 in order to form a text message for transmission to another terminal 105 in the telecommunication network.

In step 740 the control unit 120 uses the display 130 for presenting one or more words from the dictionary based on the characters received in step 730. Preferably, the words presented on the display 130 start with the same characters which are received in step 730 in order to make it possible for a user of the mobile telecommunication terminal 100 to indicate, by means of e.g. pressing a button on a keyboard in the input unit 140, a way to exchange the entered characters with the presented word.

Figure 8:
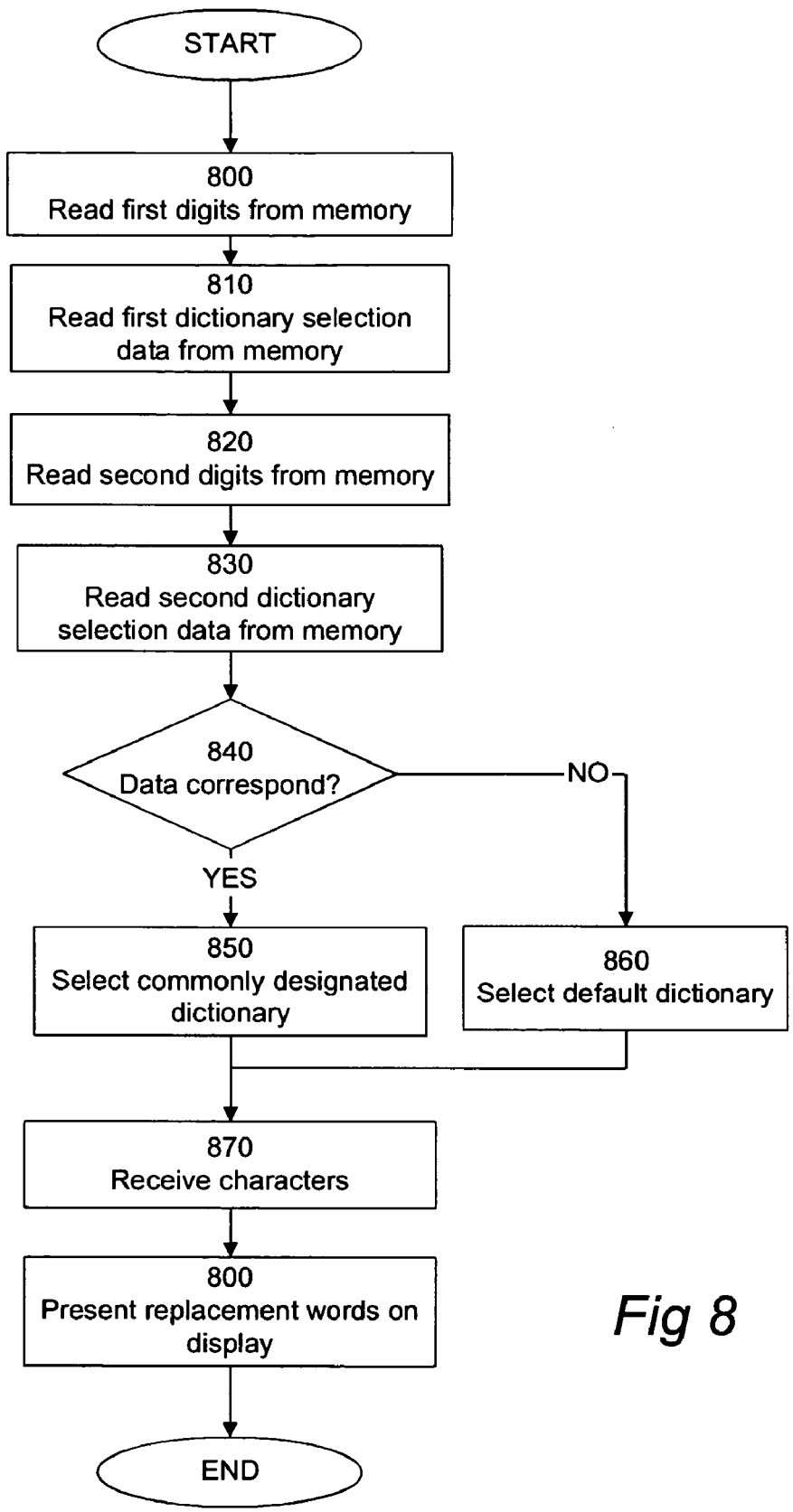
FIG. 8 is an illustration of a method for entering text in a mobile telecommunication terminal according to another embodiment of the present invention.

FIG. 8 illustrates an alternative embodiment of a method for entering text in a mobile telecommunication terminal. Steps 800 and 810 correspond to steps 700 and 710 disclosed above.

However, in step 820 the control unit 120 reads a second set of digits from the phonebook 151 in the memory 150 in the mobile telecommunication terminal 100. The digits correspond to second telecommunication number and identify a second subscriber terminal in the telecommunication network.

In step 830 the control unit 120 reads second dictionary selection data 255 from the memory 150. The second dictionary selection data 255 are associated with the second set of digits and designates at least one dictionary 152 stored in the memory 150.

In step 840 the control unit 120 determines if the first dictionary selection data 255 and the second dictionary selection data 255 correspond by comparing the first and second dictionary selection data 255. If the first dictionary selection data and the second dictionary selection data correspond, the routine jumps to step 850 wherein the control unit 120 selects the designated dictionary 152 stored in the memory 150 based on the corresponding dictionary selection data 255.

However, if the first and second dictionary selection data 255 do not correspond, the routine jumps to step 860, wherein at least one default dictionary 152 stored in the memory 150 is selected.

The routine then continues with steps 870 and 880 which correspond to steps 730 and 740 disclosed above.

Figure 9:
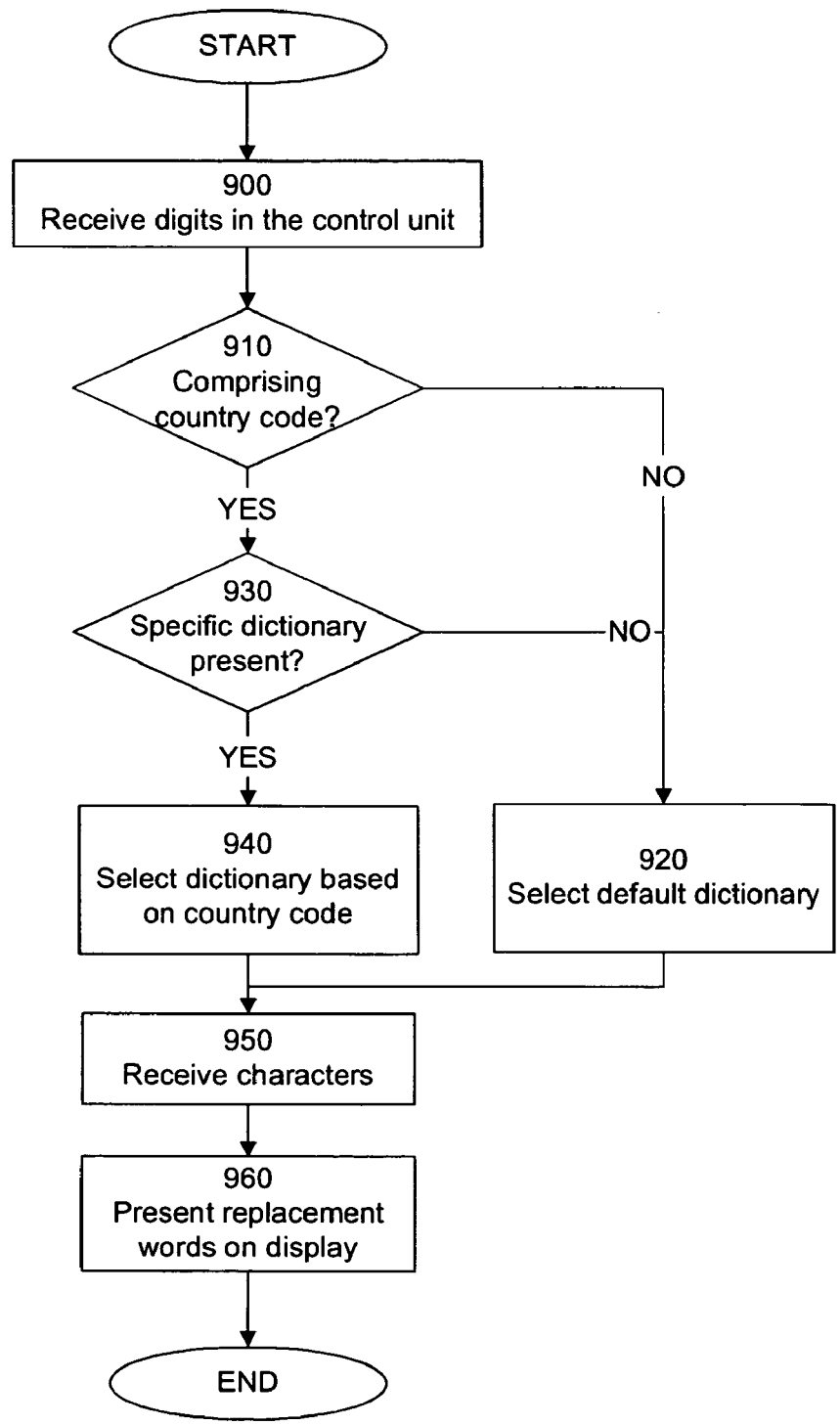
FIG. 9 is an illustration of a method for entering text in a mobile telecommunication terminal according to yet another embodiment of the present invention.

FIG. 9 is an illustration of a method for entering text in a mobile telecommunication terminal according to another embodiment of the present invention.

In step 900 the control unit 120 receives a plurality of digits. The digits identify a subscriber terminal in a telecommunication network. The digits may be received in the control unit 120 from a phonebook 151, from a previously received message from another terminal 105, or from the input unit 140.

In step 910 the control unit 120 determines if one or more of the digits entered by means of the input unit 140 or read out of the memory 150 correspond to a country code. A simple and straightforward method for determining if the digits comprise a country code is to compare the first digits in the received sequence of digits with the country codes 153 stored in the memory 150. More complex schemes taking the structure of the entire sequence of digits into account is, however, equally possible.

If the digits do not comprise a country code, the control unit in step 920 selects a default dictionary, such as an English dictionary, in the memory 150.

However, if the plurality of digits comprise a country code, the control unit 120 in step 930 determines if a dictionary 152 in a language corresponding to the country code is present in the memory 150. That is, if the telecommunication number e.g. comprises the country code 46, the control unit 120 determines if the memory 150 comprises a dictionary in Swedish. If not, the routine jumps to step 920, wherein the control unit 120 selects at least one default dictionary stored in the memory 150.

However, if the memory 150 comprises a dictionary in a language specified by the country code, the control unit 120 in step 450 selects at least one dictionary 152 which is in a language corresponding to the country code. As mentioned above, the control unit 120 may be adapted to use more than one dictionary 152 simultaneously. The dictionary selection data may hence designate e.g. a Euro dictionary being a multi-designation of an English, a German and a French dictionary 152. Alternatively, the control unit 120 may use the display 130 for presenting data identifying one or more countries or languages corresponding to the country code. The user may then select the country or language, wherein the control unit 120 selects at least one dictionary 152 which is in a language corresponding to the country code.

The routine then continues with steps 950 and 960 which correspond to steps 730 and 740 disclosed above.

Figure 10:
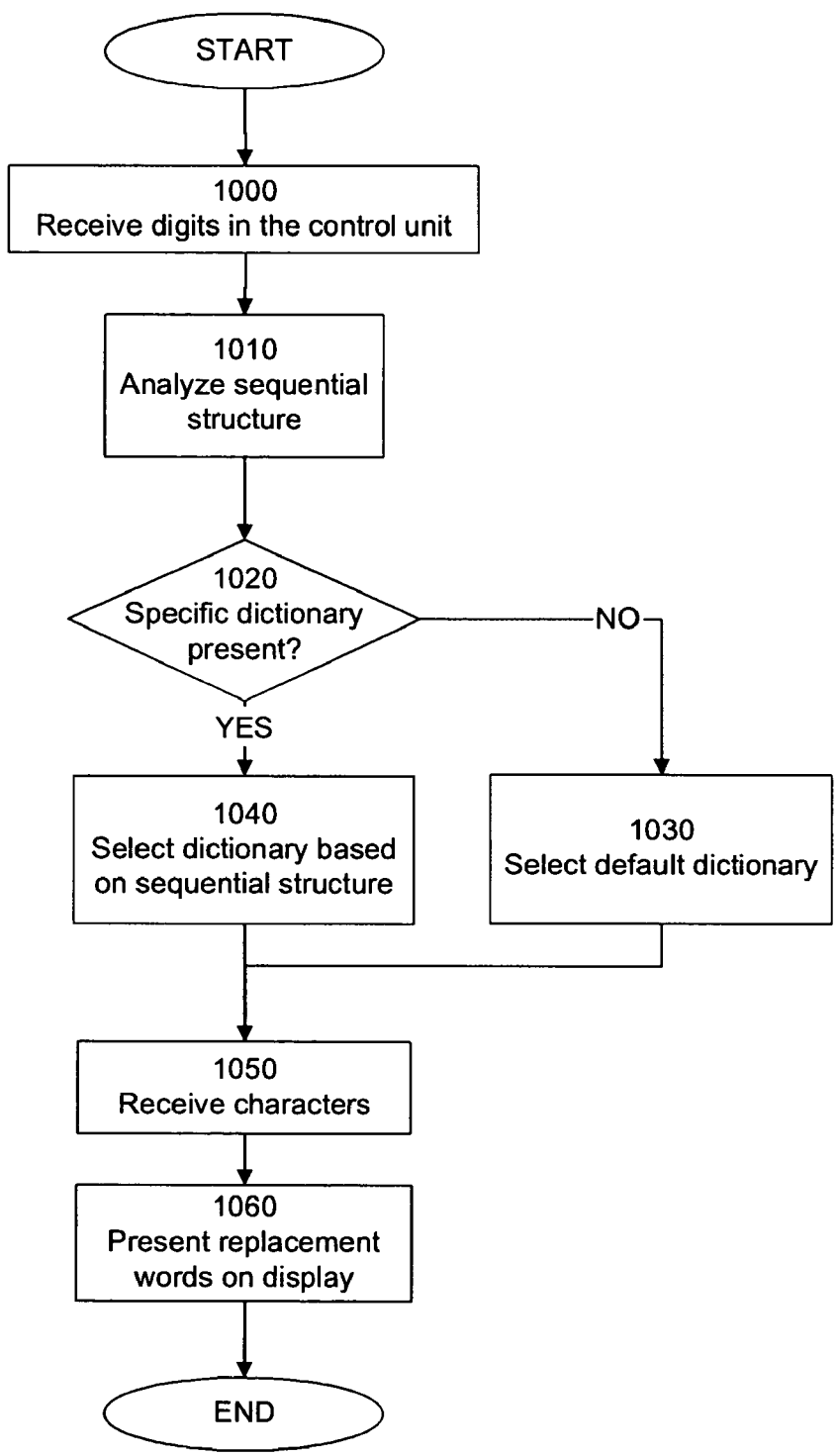
FIG. 10 is an illustration of a method for entering text in a mobile telecommunication terminal according to yet another embodiment of the present invention.

FIG. 10 is an illustration of a method for entering text in a mobile telecommunication terminal according to yet another embodiment of the present invention.

In step 1000 the control unit 120 receives a plurality of digits. The digits identify a subscriber terminal in a telecommunication network. The digits may be received in the control unit 120 from a phonebook 151, from a previously received message from another terminal 105, or from the input unit 140.

In step 1010 the control unit 120 analyzes the sequential structure of the sequence of digits received in step 1000. The analysis is preferably based on the numbering structure found in ITIJ recommendation E.164. By comparing the sequential structure of the received digits with the different numbering structures found in different countries, the control unit 120 may determine in which country the plurality of digits relate to a subscriber number.

The control unit 120 in step 1020 determines if a dictionary 152 in a language corresponding to the country in which the plurality of digits relate to a subscriber number is present in the memory 150. That is, if sequential structure of the telecommunication number points out Sweden, the control unit 120 determines if the memory 150 comprises a dictionary in Swedish.

If not, the routine jumps to step 1030, wherein the control unit selects at least one default dictionary stored in the memory 150.

However, if the memory 150 comprises a dictionary in a language specified by the sequential structure of the telecommunication number, the control unit 120 in step 1040 selects at least one dictionary 152 stored in the memory, which dictionary 152 is in a language corresponding to the country in which the plurality of digits relate to a subscriber number. Alternatively, the control unit 120 may use the display 130 for presenting data identifying one or more countries in which the plurality of digits relate to a subscriber number. The user may then select a specific country whereupon the control unit 120 selects a dictionary 152 in a language corresponding to the country in which the plurality of digits relate to a subscriber number.

The routine then continues with steps 1050 and 1060 which correspond to steps 730 and 740 disclosed above.

Figure 11:
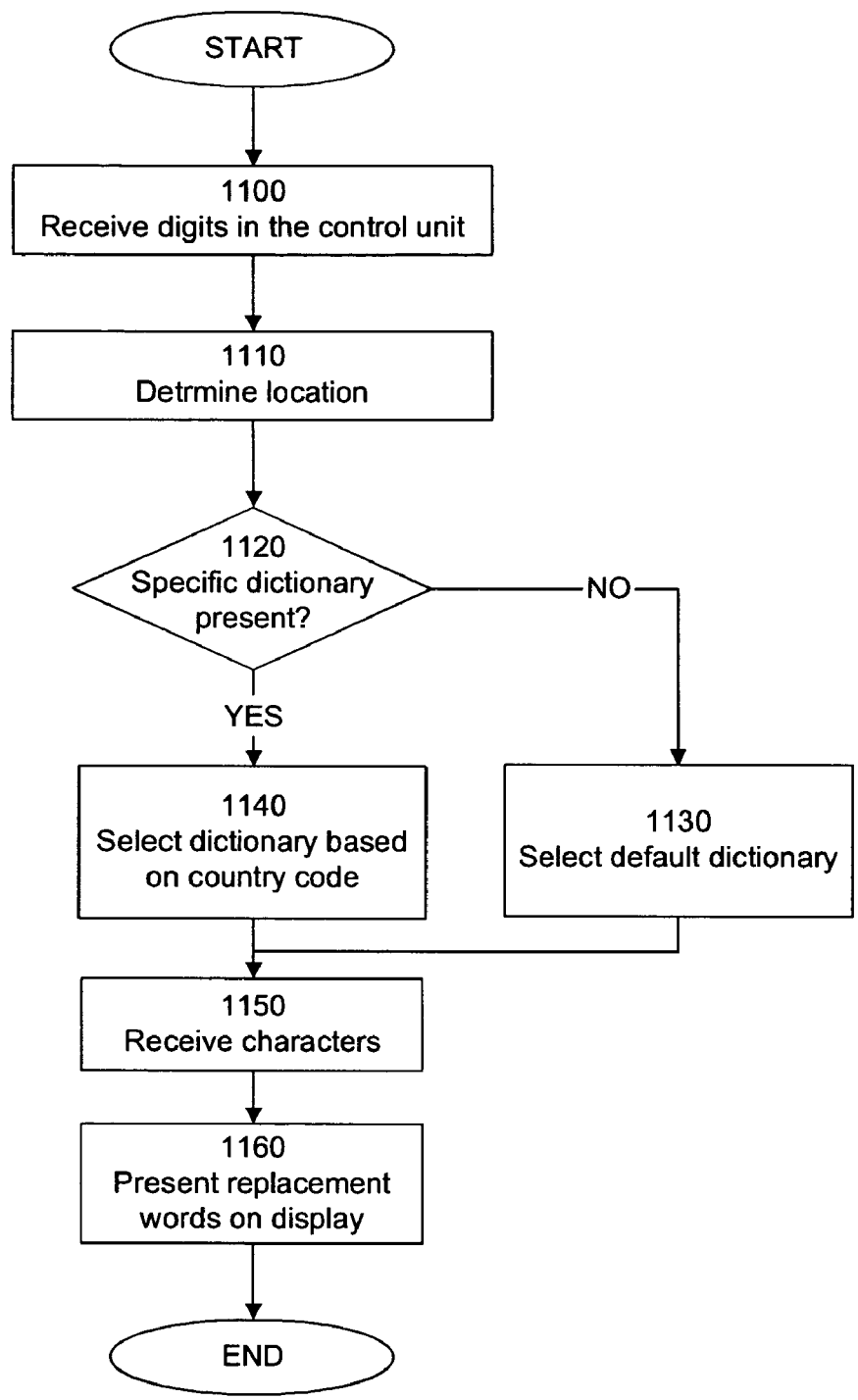
FIG. 11 is an illustration of a method for entering text in a mobile telecommunication terminal according to yet another embodiment of the present invention.

FIG. 11 is an illustration of a method for entering text in a mobile telecommunication terminal according to yet another embodiment of the present invention.

In step 1100 the user of the mobile telecommunication terminal 100 inputs a series of digits on the input unit 140 by e.g. pressing the appropriate keys on a keyboard or selecting the digits by means of a navigation wheel and the display 130. Alternatively the user selects digits in the form of a pre-stored telecommunication number from the phonebook 151 in the memory 150.

In step 1110 the control unit 120 determines in which country the mobile telecommunication terminal 100 is located by receiving a network ID form the base station 102. In case of e.g. GSM, the network ID comprises a mobile country code as defined in ITtI recommendation E.212, wherein the control unit 120 directly from the information received may determine in which country the mobile telecommunication terminal 100 is currently located. Alternatively, the control unit 120 may be coupled to a GPS receiver (not shown) and a GPS database (not shown), comprising country location information, in order to establish the current position of the mobile telecommunication terminal 100. The GPS database preferably directly provides the control unit 120 with a mobile country code corresponding to the current location of the mobile telecommunication terminal 100.

The control unit 120 in step 1120 determines if a dictionary 152 in a language corresponding to the country in which the mobile telecommunication terminal is currently located is present in the memory 150. Alternatively, the control unit 120 may use the display 130 for presenting data identifying the country corresponding to the mobile country code received form the base station 102 or the GPS database 161. The user may then select a specific country whereupon the control unit 120 selects a dictionary 152 in a language corresponding to the country indicated by the location data. That is, if the current location is Sweden, the control unit 120 determines if the memory 150 comprises a dictionary in Swedish.

If not, the routine jumps to step 1130, wherein the control unit 120 selects at least one default dictionary 152 stored in the memory 150.

However, if the memory 150 comprises a dictionary in a language specified by the current location data, the control unit 120 in step 1140 selects at least one dictionary 152 stored in the memory, which dictionary 152 is in a language corresponding to the country indicated by the location data. Alternatively, the control unit 120 may use the display 130 for presenting data identifying one or more dictionaries 152 corresponding to a language indicated by the location data. The user may then select a specific country whereupon the control unit 120 selects a dictionary 152 in a language corresponding to the country indicated by the location data.

The routine then continues with steps 1050 and 1060 which correspond to steps 730 and 740 disclosed above.

While the present invention has been particularly shown and described with reference to specific embodiments thereof, it will be understood by those skilled in the art that various changes in form and detail may be made thereto, and that other embodiments of the present invention beyond embodiments specifically described herein may be made or practiced without departing from the spirit and scope of the present invention as limited solely by the appended claims.

The invention claimed is:

1. A method for organizing data records in a memory in a mobile telecommunication terminal, said method comprising:
   receiving a plurality of digits in a control unit in the mobile telecommunication terminal, said digits identifying a subscriber terminal in a telecommunication network;
   storing the plurality of digits in a memory in the mobile telecommunication terminal;
   associating the plurality of digits with dictionary selection data stored in the memory, the dictionary selection data including at least one of a series of characters identifying a language of at least one dictionary stored in the memory, an address pointing out a start address of at least one dictionary stored in the memory and a variable indicating the ordinal number of at least one dictionary in a sequence of dictionaries in the memory;
   receiving in the control unit a mobile telecommunications network identification from a base station in the telecommunication network;
   determining, with the control unit, from the network identification in which country the mobile telecommunication terminal is located; and
   selecting the at least one dictionary based on the country in which the mobile telecommunication terminal is located or the dictionary selection data associated with the plurality of digits.

2. The method according to claim 1, comprising:
   determining if the plurality of digits comprise a country code, and
   if the plurality of digits comprise a country code, associating the plurality of digits with dictionary selection data designating at least one dictionary stored in the memory, which dictionary is in a language corresponding to the country code.

3. The method according to claim 1, comprising:
   determining if the plurality of digits comprise a country code, and
   if the plurality of digits do not comprise a country code, associating the plurality of digits with dictionary selection data designating at least one default dictionary stored in the memory.

4. The method according to claim 1, comprising:
   determining, from a sequential structure of an entire sequence of the digits, in which country the plurality of digits relate to a subscriber number; and
   associating the plurality of digits with dictionary selection data designating at least one dictionary stored in the memory, which dictionary is in a language corresponding to the country in which the plurality of digits relate to a subscriber number.

5. The method according to claim 1, comprising:
   presenting on a display in the mobile telecommunication terminal, for selection, data identifying at least one dictionary,
   receiving a selection of at least one dictionary, and
   associating the plurality of digits with dictionary selection data designating at least one dictionary based on said received selection.

6. The method according to claim 1 comprising:
   storing the dictionary selection data together with said plurality of digits in a database record in the memory.

7. A mobile telecommunication terminal comprising:
   a memory comprising at least one dictionary in a predetermined language; and
   a control unit adapted to:
      receive a plurality of digits, said digits identifying a subscriber terminal in a telecommunication network;
      receive a mobile telecommunications network identification from a base station in the telecommunication network;
      determining from the network identification in which country the mobile telecommunication terminal is located; and
      associate the plurality of digits with dictionary selection data stored in the memory, the dictionary selection data including at least one of a series of characters identifying a language of at least one dictionary stored in the memory, an address pointing out a start address of at least one dictionary stored in the memory and a variable indicating the ordinal number of at least one dictionary in a sequence of dictionaries in the memory.

8. A method for entering text in a mobile telecommunication terminal, said method comprising:
   reading a first set of digits from a memory in the mobile telecommunication terminal, said digits identifying a subscriber terminal in a telecommunication network;
   determining if the first set of digits comprise a country code,
   if the plurality of digits comprise a country code, associating the first set of digits with first dictionary selection data designating at least one dictionary stored in the memory, which dictionary is in a language corresponding to the country code;
   reading the first dictionary selection data, which are associated with the first set of digits and designating at least one dictionary stored in the memory, from the memory, the dictionary selection data being different than the plurality of digits;

selecting the at least one designated dictionary stored in the memory based on said first dictionary selection data, where selecting the at least one designated dictionary includes at least one of loading the address of a start of the at least one dictionary for sequential reading and loading the entire at least one dictionary into a random access memory of the mobile telecommunication terminal;

receiving one or more characters in the control unit;

presenting on a display in the mobile telecommunication terminal, for selection, one or more words from the dictionary wherein the one or more words are predicted by the control unit based on the received characters;

reading a second set of digits from the memory in the mobile telecommunication terminal, said digits identifying a subscriber terminal in a telecommunication network;

reading second dictionary selection data from the memory, said second dictionary selection data being associated with the second set of digits and designating at least one dictionary stored in the memory;

determining if the first dictionary selection data and the second dictionary selection data correspond; and if the first dictionary selection data and the second dictionary selection data correspond, selecting the at least one designated dictionary stored in the memory based on the corresponding dictionary selection data.

9. The method according to claim 8, wherein at least one default dictionary stored in the memory is selected if first and second dictionary selection data do not correspond.

10. A mobile telecommunication terminal comprising:
a display;
a memory comprising a first set of digits identifying a subscriber terminal in a telecommunication network; and
a control unit adapted to:
read the first set of digits from the memory;
read first dictionary selection data, which are associated with the first set of digits and designating at least one dictionary stored in the memory, from the memory, the dictionary selection data including at least one of a series of characters identifying a language of at least one dictionary stored in the memory, an address pointing out a start address of at least one dictionary stored in the memory and a variable indicating the ordinal number of at least one dictionary in a sequence of dictionaries in the memory;
receive a mobile telecommunications network identification from a base station in the telecommunication network;
determine from the network identification in which country the mobile telecommunication terminal is located; and
select the at least one designated dictionary stored in the memory based on the country in which the mobile telecommunication terminal is located or based on said first dictionary selection data, where selecting the at least one designated dictionary includes at least one of loading the address of a start of the at least one dictionary for sequential reading and loading the entire at least one dictionary into a random access memory of the mobile telecommunication terminal;
receive one or more characters; and
present on the display, for selection, one or more words from the dictionary wherein the one or more words are predicted by the control unit based on the received characters.

11. A method for entering text in a mobile telecommunication terminal, said method comprising:
receiving a plurality of digits in a control unit in the mobile telecommunication terminal, said digits identifying a subscriber terminal in a telecommunication network;
receiving in the control unit a mobile telecommunications network identification from a base station in the telecommunication network;
determining, with the control unit, from the network identification in which country the mobile telecommunication terminal is located;
selecting at least one dictionary stored in a memory of the mobile communication terminal based on the country in which the mobile telecommunication terminal is located or the plurality of digits where selecting the at least one dictionary based on the plurality of digits includes:
determining if the plurality of digits comprise a country code;
if the plurality of digits comprise a country code, selecting the at least one dictionary, which dictionary is in a language corresponding to the country code, where selecting the at least one designated dictionary includes at least one of loading the address of a start of the at least one dictionary for sequential reading and loading the entire at least one dictionary into a random access memory of the mobile telecommunication terminal;
if the plurality of digits do not comprise a country code, associating the plurality of digits with dictionary selection data designating a default dictionary stored in the memory and selecting the default dictionary, the dictionary selection data including at least one of a series of characters identifying a language of at least one dictionary stored in the memory, an address pointing out a start address of at least one dictionary stored in the memory and a variable indicating the ordinal number of at least one dictionary in a sequence of dictionaries in the memory;
receiving one or more characters in the control unit; and
presenting, for selection, one or more words from the dictionary wherein the one or more words are predicted by the control unit based on the received characters.

12. A mobile telecommunication terminal comprising:
a display;
a memory comprising at least one dictionary; and
a control unit adapted to:
receive a plurality of digits, said digits identifying a subscriber terminal in a telecommunication network;
receive a mobile telecommunications network identification from a base station in the telecommunication network;
determine from the network identification in which country the mobile telecommunication terminal is located;
select at least one dictionary stored in a memory of the mobile communication terminal based on the country in which the mobile telecommunication terminal is located or the plurality of digits where the control unit is configured to:
determine if the plurality of digits comprise a country code;
if the plurality of digits comprise a country code, select at least one dictionary stored in the memory, which dictionary is in a language corresponding to the country code, where selecting the at least one designated dictionary includes at least one of loading the address of a start of the at least one dictionary for sequential reading and loading the entire at least one dictionary into a random access memory of the mobile telecommunication terminal;

if the plurality of digits do not comprise a country code, associating the plurality of digits with dictionary selection data designating a default dictionary stored in the memory and selecting the default dictionary, the dictionary selection data including at least one of a series of characters identifying a language of at least one dictionary stored in the memory, an address pointing out a start address of at least one dictionary stored in the memory and a variable indicating the ordinal number of at least one dictionary in a sequence of dictionaries in the memory;

receive one or more characters in the control unit; and present on the display, for selection, one or more words from the dictionary wherein the one or more words are predicted by the control unit based on the received characters.

13. A method for entering text in a mobile telecommunication terminal, said method comprising:

receiving a plurality of digits in a control unit in the mobile telecommunication terminal, said digits identifying a subscriber terminal in a telecommunication network;

determining, from a sequential structure of an entire sequence of the digits, in which country the plurality of digits relate to a subscriber number;

receiving in the control unit a mobile telecommunications network identification from a base station in the telecommunication network;

determining, with the control unit, from the network identification in which country the mobile telecommunication terminal is located;

selecting at least one dictionary stored in the memory based on the country in which the mobile telecommunication terminal is located or the plurality of digits which dictionary is in a language corresponding to the country in which the mobile telecommunication terminal is located or where the plurality of digits relate to a subscriber number;

receiving one or more characters in the control unit; and presenting, for selection, one or more words from the dictionary wherein the one or more words are predicted by the control unit based on the received characters.

14. A mobile telecommunication terminal comprising:

a display;

a memory comprising at least one dictionary; and a control unit adapted to:

receive a plurality of digits, said digits identifying a subscriber terminal in a telecommunication network;

determine, from a sequential structure of an entire sequence of the digits, in which country the plurality of digits relate to a subscriber number;

receive a mobile telecommunications network identification from a base station in the telecommunication network;

determine from the network identification in which country the mobile telecommunication terminal is located;

select at least one dictionary stored in the memory based on the country in which the mobile telecommunication terminal is located or the plurality of digits which dictionary is in a language corresponding to the country in which the mobile telecommunication terminal is located or where the plurality of digits relate to a subscriber number;

receive one or more characters in the control unit; and present on the display, for selection, one or more words from the dictionary wherein the one or more words are predicted by the control unit based on the received characters.

15. A mobile telecommunication terminal comprising a memory comprising a database with records, each record comprising:

a plurality of digits identifying a subscriber in a telecommunications network, an indicator identifying in which country the mobile telecommunication terminal is located, the country being determined from a mobile communication network identification obtained from a base station in the mobile telecommunication network, and dictionary selection data stored in the memory, the dictionary selection data including at least one of a series of characters identifying a language of at least one dictionary stored in the memory, an address pointing out a start address of at least one dictionary stored in the memory and a variable indicating the ordinal number of at least one dictionary in a sequence of dictionaries in the memory.

16. A mobile telecommunication terminal comprising:

a memory comprising at least one dictionary in a predetermined language;

receiving means for receiving a plurality of digits;

said digits identifying a subscriber terminal in a telecommunication network;

associating means for associating the plurality of digits with dictionary selection data stored in the memory, the dictionary selection data including at least one of a series of characters identifying a language of at least one dictionary stored in the memory, an address pointing out a start address of at least one dictionary stored in the memory and a variable indicating the ordinal number of at least one dictionary in a sequence of dictionaries in the memory;

receiving means for receiving a mobile telecommunications network identification from a base station in the telecommunication network;

determining means for determining from the network identification in which country the mobile telecommunication terminal is located; and selecting means for selecting the at least one dictionary based on the country in which the mobile telecommunication terminal is located or the dictionary selection data associated with the plurality of digits.

17. A mobile telecommunication terminal comprising:

a memory comprising a first set of digits identifying a subscriber terminal in a telecommunication network;

reading means for reading the first set of digits and first dictionary selection data, which data are associated with the first set of digits and designating at least one dictionary stored in the memory, from the memory, the first dictionary selection data including at least one of a series of characters identifying a language of at least one dictionary stored in the memory, an address pointing out a start address of at least one dictionary stored in the memory and a variable indicating the ordinal number of at least one dictionary in a sequence of dictionaries in the memory;

receiving means for receiving a mobile telecommunications network identification from a base station in the telecommunication network;

determining means for determining from the network identification in which country the mobile telecommunication terminal is located;

selecting means for selecting the at least one designated dictionary stored in the memory based on the country in which the mobile telecommunication terminal is located or based on said first dictionary selection data, where selecting the at least one designated dictionary includes at least one of loading the address of a start of the at least one dictionary for sequential reading and loading the entire at least one dictionary into a random access memory of the mobile telecommunication terminal;

receiving means for receiving one or more characters; and a display adapted to display, for selection, one or more words from the dictionary wherein the one or more words are predicted by a prediction means of the mobile telecommunication terminal based on the received characters.

18. A mobile telecommunication terminal comprising:

a memory comprising at least one dictionary;

receiving means for receiving a plurality of digits, said digits identifying a subscriber terminal in a telecommunication network;

determining means for determining if the plurality of digits comprise a country code;

receiving means for receiving a mobile telecommunications network identification from a base station in the telecommunication network;

determining means for determining from the network identification in which country the mobile telecommunication terminal is located;

selecting means for selecting at least one dictionary stored in the memory based on the country in which the mobile telecommunication terminal is located or based on the plurality of digits where if the plurality of digits comprise a country code, which dictionary is in a language corresponding to the country code, and selecting the at least one designated dictionary includes at least one of loading the address of a start of the at least one dictionary for sequential reading and loading the entire at least one dictionary into a random access memory of the mobile telecommunication terminal;

associating means for associating the plurality of digits with dictionary selection data designating a default dictionary stored in the memory if the plurality of digits no not comprise a country code and a selecting means for selecting the default dictionary, the dictionary selection data including at least one of a series of characters identifying a language of at least one dictionary stored in the memory, an address pointing out a start address of at least one dictionary stored in the memory and a variable indicating the ordinal number of at least one dictionary in a sequence of dictionaries in the memory;

receiving means for receiving one or more characters in a control unit of the mobile telecommunication terminal; and a display adapted to display, for selection, one or more words from the dictionary wherein the one or more words are predicted by the control unit based on the received characters.

19. A mobile telecommunication terminal comprising:

a memory comprising at least one dictionary;

receiving means for receiving a plurality of digits, said digits identifying a subscriber terminal in a telecommunication network;

determining means for determining, from a sequential structure of an entire sequence of the digits, in which country the plurality of digits relate to a subscriber number;

receiving means for receiving a mobile telecommunications network identification from a base station in the telecommunication network;

determining means for determining from the network identification in which country the mobile telecommunication terminal is located;

selecting means for selecting at least one dictionary stored in the memory based on the country in which the mobile telecommunication terminal is located or based on said first dictionary selection data, which dictionary is in a language corresponding to the country in which the mobile telecommunication terminal is located or the country in which the plurality of digits relate to a subscriber number;

receiving means for receiving one or more characters in a control unit of the mobile telecommunication terminal; and a display adapted to display, for selection, one or more words from the dictionary wherein the one or more words are predicted by the control unit based on the received characters.

20. The method of claim 1, further comprising:

determining from a global positioning system in which country the mobile telecommunication terminal is located, where the global positioning system is connected to the mobile telecommunication terminal and includes dictionary selection data stored in a global positioning system database; and selecting the at least one dictionary based on the dictionary selection data stored in the global positioning system database based on the country in which the mobile telecommunication terminal is located or based on the dictionary selection data associated with the plurality of digits.

* * * * *

UNITED STATES PATENT AND TRADEMARK OFFICE
CERTIFICATE OF CORRECTION

| | | |
|---|---|---|
| PATENT NO. | : 7,623,860 B2 | Page 1 of 1 |
| APPLICATION NO. | : 10/976093 | |
| DATED | : November 24, 2009 | |
| INVENTOR(S) | : Hurst | |

It is certified that error appears in the above-identified patent and that said Letters Patent is hereby corrected as shown below:

Title Page, Item (75) Inventor: delete "Helsinski" and insert --Helsinki-- therefor.

Col. 19, Ln. 48, delete "no" and insert --do-- therefor.

Signed and Sealed this

Sixth Day of July, 2010

David J. Kappos
*Director of the United States Patent and Trademark Office*